Feb. 3, 1931.  H. A. KNOX ET AL  1,791,167
EPICYCLIC TRANSMISSION
Filed March 3, 1926   2 Sheets-Sheet 1

Inventor
Harry A. Knox
Bert F. Baker
By W. N. Roach.
Attorney

Feb. 3, 1931.                H. A. KNOX ET AL                  1,791,167
                          EPICYCLIC TRANSMISSION
                          Filed March 3, 1926        2 Sheets—Sheet 2
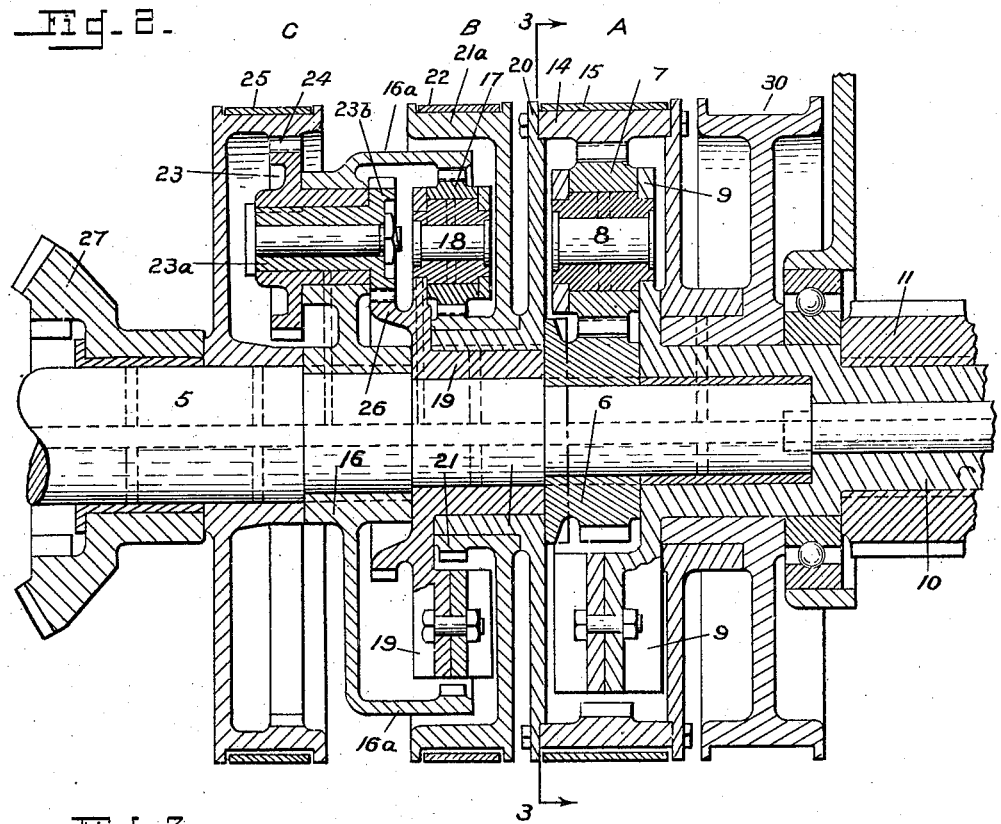
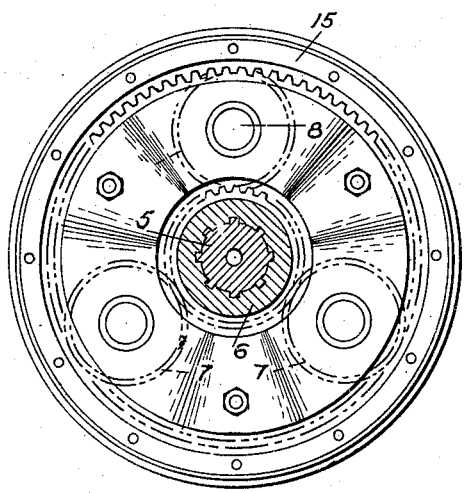
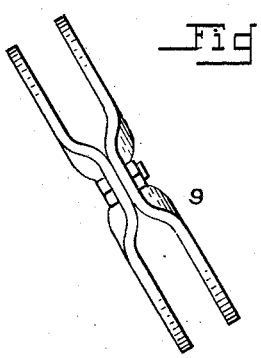
Inventor
Harry A. Knox
Bert F. Baker
By W. N. Roach
Attorney Patented Feb. 3, 1931

1,791,167

UNITED STATES PATENT OFFICE

HARRY A. KNOX AND BERT F. BAKER, OF DAVENPORT, IOWA

EPICYCLIC TRANSMISSION

Application filed March 3, 1926. Serial No. 92,077.

(GRANTED UNDER THE ACT OF MARCH 3, 1883, AS AMENDED APRIL 30, 1928; 370 O. G. 757)

The invention described herein may be manufactured and used by or for the Government for governmental purposes without the payment to us of any royalty thereon.

This invention relates to an epicyclic transmission of the type in which three changes of speed are obtained from three groups of gears, all three speeds being obtained from the planetary movement of the first group.

In the application of such transmissions to track laying vehicles a plurality of speeds are desirable to provide for maneuvering of the vehicle but it is also requisite to provide a suitable range of speeds.

The principal object of this invention then is to provide such a range of speeds and in accomplishing this purpose to so arrange the transmission unit that by its compactness it will be appropriate in size to the vehicle wherein used.

The result is produced by providing one element constituting the ring of the first speed epicyclic train, the planet set of the second speed group and the sun wheel of the third speed group; by incorporating a reduction element in the planetary set of the third speed group; and by arranging to lock the sun wheel of the second group.

To these and other ends, our invention consists in the construction, arrangement and combination of elements, described hereinafter and pointed out in the claims forming a part of this specification.

A practical embodiment of our invention is illustrated in the accompanying drawing, wherein:

Fig. 2 is an enlarged sectional view of the three speed groups;

Fig. 3 is a detail sectional view on the line 3—3 of Fig. 2; and

Fig. 4 is a fragmentary end view of Fig. 3.

Figure 1:
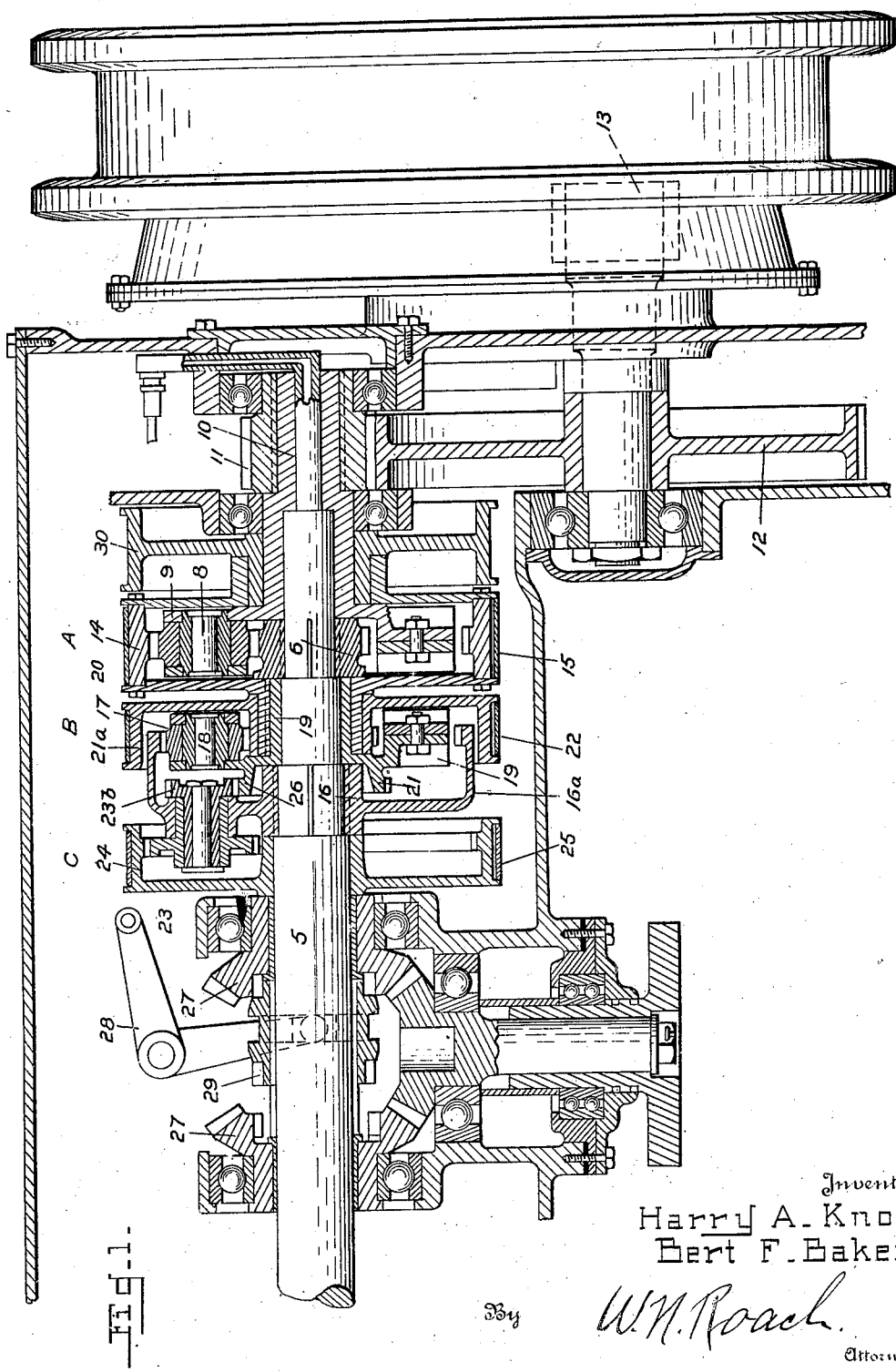
Fig. 1 is a longitudinal sectional view through a transmission unit constructed in accordance with the invention.

Referring to the drawings by numerals of reference:

The transmission unit for each track of the vehicle comprises three epicyclic groups arranged side by side on the drive shaft 5 and designated A, B, and C, respectively, for the low, intermediate and high speeds.

The first or low speed group consists of a sun wheel 6 splined on the shaft 5 and meshing with planet wheels 7 mounted on studs 8 projecting from a disk 9 formed on a driven shaft 10 which transmits power through a pinion 11 and reduction gear 12 to the final drive unit 13. Surrounding the planet pinion 7 and meshing therewith is an internally toothed ring 14 which is externally adapted to receive a brake band 15 whereby it may be held stationary as is well understood.

The second group consists of a disk 16 splined to the shaft 5 and formed with an overhanging ring 16a internally meshing with planet wheels 17 mounted on studs 18 carried by a disk 19 which is splined to a plate 20 secured to and forming part of the ring 14 of the first group. The planet wheels 17 also mesh with a sun wheel 21 which constitutes the hub of the wheel 21a journaled on the hub of the plate 20 and adapted to receive a brake band 22 similar to the ring of the first group.

The third group is closely identified with the second group and includes a set of planet wheels 23 meshing with an internally toothed ring 24 adapted to receive a brake band 25. The planet wheels 23 are carried by the motor driven disk 16 through the instrumentality of a spool 23a on which is integral a reduction gear 23b meshing with sun wheel 26 integral with the disk 19. It will thus be noted that the disk 19 is a unit including the sun wheel of the third group, the planet set of the second group and the ring of the first group.

The operation of the mechanism is as follows:

When the ring 14 of the first group A is braked the motor driven sun wheel 6 causes the planet wheels 7 to turn on their own axes and also to make an orbital progression around the sun wheel, which movement is given to the driven shaft 10. The other two speed groups, B and C, during this phase run idle.

For the second speed group the brake band 22 alone is applied to hold stationary the sun wheel 21. The motor driven ring 16a driving the planet wheels 17 causes them to make an orbital movement around the sun wheel and carry around the disk 19 and with it the ring 14 of the first group. The ring 14 will then revolve in the same direction as the sun wheel 6 and the resulting differential in speed between these two elements gives a proportional orbital movement to the planet wheels of the first group and consequently a second speed to the driven shaft 10.

For the third speed group the brake band 25 is applied. The planet pinions 23—23b carried by the motor driven disk 16 are thereby caused to revolve at a definite ratio with respect to engine speed and drive the sun wheel 26 integral on the disk 19 which being connected to the ring 14 of the first group, said ring will be driven at a certain definite speed. The differential of speed between this ring and the sun wheel 6 will control the speed of the driven shaft 10 in the same manner as in the second speed. The third speed is thus compounded of the third and first groups, the second group being omitted.

Power from the motor is transmitted to the drive shaft 5 by means of the beveled gear wheels 27—27 loosely mounted thereon and each provided with a clutch element 28 for engagement with a sliding flux 29 splined to the shaft 5. This arrangement is of the conventional type and provides for forward or reverse drive of the shaft according to which of the beveled gears is engaged.

The transmission unit for each track is also provided with a brake element 30 which is splined on the driven shaft 10.

We claim:

1. An epicyclic transmission including a driving shaft, three groups of epicyclic gearing carried thereon and operatively connected thereto for transmitting power at low, intermediate and high speeds, the ring of the low speed group being operatively connected to the planet carrier of the intermediate speed group and to the sun wheel of the high speed group, a driven shaft in operable connection with the low speed group, means for locking the ring of the low speed group, means for locking the sun wheel of the intermediate speed group to compound the intermediate and low speed groups and means for locking the ring of the high speed group to compound the high and low speed groups.

2. An epicyclic transmission including a driving shaft, three groups of epicyclic gearing carried thereon and operatively connected thereto for transmitting power at low, intermediate and high speeds, an element of the low speed group being operatively connected to the intermediate speed group and to the high speed group, a driven shaft in operable connection with the low speed group, means for locking the ring of the low speed group, means for locking the sun wheel of the intermediate speed group to compound the intermediate and low speed groups and means for locking the ring of the high speed group to compound the high and low speed groups.

3. In a transmission, a forward and reverse driving shaft, three groups of epicyclic gearing carried thereon and operatively connected thereto, the planet carrier of the intermediate group being operatively connected to the ring of one end group and to the sun wheel of the other end group, a driven shaft in operative connection with the end group whose ring is connected to the planet carrier of the intermediate group, and a control for each group.

4. In a transmission, a driving shaft, a driven shaft, a low speed epicyclic gearing connected to the driving and to the driven shaft, a high speed epicyclic gearing connected to the driving shaft and to the ring of the low speed epicyclic gearing, the planetary element of said high speed epicyclic including reduction gearing, and a control for each epicyclic gearing.

5. An epicyclic transmission including a driving shaft, three groups of epicyclic gearing carried thereon, a driven shaft in operable connection with the first group, a direct driven ring for the second group and a direct driven planet carrier for the third group, both the ring and planet carrier carried by the same member.

6. An epicyclic transmission including a driving shaft, three groups of epicyclic gearing carried thereon, a driven shaft in operable connection with the first group, a direct driven ring for the second group and a direct driven planet carrier for the third group.

7. An epicyclic transmission including a driving shaft, interrelated groups of epicyclic gearing carried thereon, the planet carrier of one end group directly connected to the driving shaft, a driven shaft in operable connection only with the other end group and a control for each group.

8. The combination with a driving shaft and a driven shaft, of a group of epicyclic gearing operatively connecting said shafts, a plurality of direct driven groups of epicyclic gearing differentially connected through the first mentioned group of epicyclic gearing to the driven shaft and means for selectively compounding the first mentioned group with either of the plurality of groups.

HARRY A. KNOX.
BERT F. BAKER.